United States Patent [19]

Smart

[11] Patent Number: 4,979,990
[45] Date of Patent: Dec. 25, 1990

[54] FOAMABLE COMPOSITION

[75] Inventor: Roderick M. Smart, Birmingham, England

[73] Assignee: Fosroc International Limited, Birmingham, England

[21] Appl. No.: 425,496

[22] Filed: Oct. 17, 1989

Related U.S. Application Data

[63] Continuation of Ser. No. 128,552, Dec. 3, 1987, abandoned.

[51] Int. Cl.$^5$ ............................ C04B 7/14; C04B 7/12
[52] U.S. Cl. .............................. 106/679; 106/DIG. 1; 106/705
[58] Field of Search ..................... 106/87, 117, DIG. 1

[56] References Cited

U.S. PATENT DOCUMENTS

| | | | |
|---|---|---|---|
| 2,629,667 | 2/1953 | Kaveler | 106/93 |
| 4,209,335 | 6/1980 | Katayama et al. | 106/89 |
| 4,240,952 | 12/1980 | Hulbert, Jr. et al. | 106/DIG. 1 |
| 4,266,980 | 5/1981 | Chudo et al. | 106/117 |
| 4,494,990 | 1/1985 | Harris | 106/117 |

FOREIGN PATENT DOCUMENTS

| | | | |
|---|---|---|---|
| 49-129720 | 12/1974 | Japan | 106/117 |
| 54-070334 | 6/1979 | Japan | 106/DIG. 1 |
| 55-051745 | 4/1980 | Japan | 106/117 |
| 58-140356 | 8/1983 | Japan | 106/117 |
| 59-169957 | 9/1984 | Japan | 106/315 |
| 61-146742 | 7/1986 | Japan | 106/117 |
| 1178720 | 9/1985 | U.S.S.R. | 106/117 |

*Primary Examiner*—Mark L. Bell
*Assistant Examiner*—Anthony J. Green
*Attorney, Agent, or Firm*—Caesar, Rivise, Bernstein, Cohen & Pokotilow, Ltd.

[57] ABSTRACT

A composition to be mixed with water to form rapidly a lightweight high strength set product, as well as a method of placing such compositions at a desired location and the reaction produced. The composition comprises about 1 to about 10% by weight of a gas producing agent which will release gas under acidic conditions, about 1 to about 15% by weight of a rapid setting agent which will form an acid solution in water, and an effective amount of a particulate pozzolan.

2 Claims, No Drawings

FOAMABLE COMPOSITION

This application is a continuation of application Ser. No. 07/128,552, filed Dec. 3, 1987 abandoned.

The invention relates to a foamable composition, and in particular a rapid setting foamable grout for use in providing low density high strength products in e.g. the building, construction and mining and other industries.

It is known from GB-A-402 101 (published in 1933) to form a porous plaster from a water and a composition comprising particulate anhydrite, an accelerator such as a sulphate, a gas producing ingredient e.g. a carbonate to produce carbon dioxide gas, and a small amount of Portland cement. The composition is allowed to set at a slow rate. The cement is present to reinforce the cellubar structure, i.e., to prevent premature collapse. Clinker may also be present. The porosity may be varied by variation in the gas producing system.

It is known from U.S. Pat. No. 2,606,127 (published in 1952) to form a composition for making lightweight building insulating articles, the composition comprising acidulous anhydrous calcium sulphate residue and a siliceous material e.g. fly ash, smelter slags, cinders, hydrated combustion residues.

The composition expands by about 25 to 30% and the density is about 0.9 to 1.2. This invention is based on the realisation that if the composition comprises essentially a defined particulate material, a rapid setting agent and a source of expansion gas and optionally a strengthening agent and light weight fillers the composition can be set rapidly to form a lightweight high strength product.

Accordingly in one aspect the invention provides a composition to be mixed with water to form rapidly a lightweight high strength set product, comprising, a particulate material, an accelerator and a gas producing ingredient, characterised in that the particulate material comprises a pozzolan and the accelerator is a rapid setting agent.

The pozzolan is preferably a fly ash, preferably pulverised fly ash having a particle size less than about 40 micron. Slags such as blast furnace slag may be used, especially if measures are taken to reduce the evolution of hydrogen sulphide therefrom. Cements are not suitable as the only filler because of their alkalinity but a proportion of a cement can be tolerated so long as the grout is sufficiently acidic for sufficient time to cause or allow the evolution of the expansion gas.

When the rapid setting composition of the invention is allowed to set, the gas evolved causes a foaming, which increases the total volume significantly. Before the foam can collapse, the rapid setting agent causes the composition to set, as a result of which the foam is quickly stabilised. The use of additives such as foam stabilisers can accordingly be reduced or avoided.

The expansion gas is preferably carbon dioxide and the source thereof may be calcium carbonate, sodium carbonate, magnesium carbonate or the like. Bicarbonates may also be used.

It is an advantageous feature of the invention that the source of the expansion gas is selected so that the gas expansion does not take place until required, for example, until a grout incorporating the rapid setting composition is placed. This degree of control can be achieved by providing the source of expansion gas with a protective coating which is released or removed when required. As preferred examples the coating may be a starch or stearate coating applied to the source of expansion gas, which coating is dissolved off under slightly acidic conditions, e.g. at pH of about 4 to about 6.

A strengthening agent may be present to strengthen the foamed composition. The strengthening agent is preferably calcium sulphate hemi hydrate or lime.

In a further present aspect of the invention a composition includes a low density particulate filler which must be the one which has a density not exceeding 0.5 gm/cm so that the density of the formed product will still be low. In addition the filler must be one which will not detract from the high strength. This can be achieved either by selecting filler which also has a relatively high strength or which will be reactive in this context and thus contribute to the high strength. Fillers which are of low density and non-reactive include perlite, vermiculites and foamed polystyrene; fillers which are of low density and reactive include hollow pulverised fly ash spheres; expanded blast furnace slags; hollow glas spheres; foamed glass beads.

The particle size of the particulate filler component will be selected to be compatible with the other ingredients. Typically, the particles will have a mean particle diameter of below 5 mm, and above 0.1 mm.

The amount of filler will usually be less than proportion of the pozzolan. In one preferred aspect the invention provides a method of placing a filler containing rapid setting composition comprising supplying to the desired location from one source a dry blend comprising a filler, a fast setting agent and a source of an expansion gas and from a second source water, and allowing or causing the water to mix with the dry blend.

As a preferred method, an aqueous slurry formed of the filler and the source of the expansion agent is pumped from one source to the desired location. A solution of the fast setting agent is pumped from a second source to the desired location. Before placement the two liquids are mixed, e.g. by use of a mixing nozzle of the type used in spray concrete, and the combined liquids are placed as required. As a result, a foam is quickly formed on the sprayed substrate, and the foam is set before it can collapse. This is especially advantageous when spraying vertical walls and permits the speedy removal of shuttering.

A composition of the invention may be used for a variety of industrial purposes. For example, in mining, the composition may be used to form a set body in void filling, archway filling, roof support and mine wall insulation. In construction the composition may be used as a set body in cavity insulation, thermal insulation, cavity filling, fire control or protection and lightweight panels. The body may be shaped up as boards, blocks, etc.

The invention is illustrated by the following examples, in which unless otherwise stated parts are by weight.

EXAMPLE 1

A dry powder blend was made up to contain the following:

| | |
|---|---|
| pulverised fly ash | 90 |
| $Al_2(SO_4)_3 \cdot 14H_2O$ | 7 |
| $CaCO_3$ | 3 |

The powder was mixed with water (25 parts) in a container to form a grout which foamed almost immediately and expanded rapidly to nearly fill the container, the expansion in volume being between 3 and 4 times. The foamed grout had the following properties.

| | |
|---|---|
| Time to maximum volume | about 15 seconds |
| Time to self supporting strength | about 30 seconds |
| Density, | |
| 1 hour | 0.53 gm/cm$^3$ |
| 24 hours | 0.51 gm/cm$^3$ |
| Compressive strength (28 days) | 2.4 N/mm$^2$ |

EXAMPLE II

A powder blend was made up of:

| | |
|---|---|
| pulverised fly ash | 75 |
| Ca SO$_4$ . $\frac{1}{2}$H$_2$O | 15 |
| CaCO$_3$ | 2 |
| Al$_2$ (SO$_4$)$_3$ . 14H$_2$O | 8 |

This powder was mixed with water (25 parts) to form a grout. On addition of water, the grout foamed immediately and set within about one minute with fast strength development. The foamed grout had the following properties:

| | |
|---|---|
| Time to maximum volume | about 17 seconds |
| Time to self-supporting strength | about 20 seconds |
| Density, | |
| 1 hour | 0.56 gm/cm$^3$ |
| 24 hours | 0.52 gm/cm$^3$ |
| Compressive strength (28 days) | 7.41 N/mm$^2$ |

EXAMPLE III 100 gms of powder comprising:

| | |
|---|---|
| pulverised fly ash | 80 |
| CaSO$_4$ . $\frac{1}{2}$H$_2$O | 17 |
| CaCO$_3$ | 3 | was added to 20 ml of a solution of 500 gms Al$_2$(SO$_4$)$_3$. 14H$_2$O dissolved in 1000 gm water. Foaming occurred after a few seconds and the foamed mass became rigid after about 70 seconds. The grout had the following properties:

| | |
|---|---|
| Time to maximum volume | about 12 seconds |
| Density, | |
| 1 hour | 0.49 gm/cm$^3$ |
| 24 hours | 0.45 gm/cm$^3$ |
| Compressive strength (28 days) | 9.1 N/mm$^2$ |

EXAMPLE IV

Different proportions of aluminium sulphate were added to compositions comprising pulverised fly ash and water, and the rate of setting was noted. The following results were obtained:

| aluminium sulphate | initial set (min) | final set (min) |
|---|---|---|
| 0.0 | 24 hours + | — |
| 0.5 | 220 | 300 |
| 1.0 | 190 | 240 |
| 1.5 | 140 | 200 |
| 2.0 | 18 | 55 |
| 2.5 | 6 | 35 |
| 5.0 | 4 | 9 |

EXAMPLE V

Different proportions of limestone were added to compositions comprising:

| | |
|---|---|
| pulverised fly ash | 60 |
| CaSO$_4$ . $\frac{1}{2}$H$_2$O | 10 |
| Al(SO$_4$)$_3$ . 14H$_2$O | 15 |
| water | 20 | and the volume of grout obtained and the grout density were measured after 24 hours. The following results were obtained:

| Amount limestone | Grout volume (cm$^3$) | Grout density (gm/cm$^3$) |
|---|---|---|
| 2.5 | 206 | 0.52 |
| 5.0 | 277 | 0.40 |
| 10.0 | 349 | 0.33 |

These results show that by increasing the concentration of limestone, a source of CO$_2$ gas, the volume of the grout is increased and the density decreased.

EXAMPLE VI

Different proportions of calcium sulphate hemi hydrate CaSO$_4$. $\frac{1}{2}$H$_2$O were added to compositions comprising pulverised fly ash, aluminium sulphate and water, and the compressive strengths of the set grout were measured after 28 days. The following results were obtained:

| % hemi hydrate | compressive strength |
|---|---|
| 0 | 1.21 |
| 5 | 1.94 |
| 10 | 4.38 |
| 15 | 6.82 |
| 20 | 9.46 |
| 25 | 13.21 | which demonstrates that the presence of this additive enhances the compressive strength of the set grout.

EXAMPLE VII 100 gms of powder comprising:

| | |
|---|---|
| pulverised fuel ash | 60 |
| ordinary Portland cement | 30 |
| CaCO$_3$ | 12 | was mixed with 30 ml of a solution of 500 gms Al$_2$(SO$_4$)$_3$. 14H$_2$O dissolved in 1000 gm water. Foaming occurred almost immediately and the foamed mass set rapidly to give a foamed grout having the following properties:

| | |
|---|---|
| Density, 1 hour | 0.51 gm/cm$^3$ |
| 24 hours | 0.48 gm/cm$_3$ |
| Compressive strength (28 days) | 6.4 N/mm$_2$ |

This example shows that even when a proportion of cement is present, there is sufficient acidity for the $CO_2$ to be released to foam the fuel ash.

EXAMPLE VIII 100 gms of powder comprising:

| | |
|---|---|
| anhydrite or Plaster of Paris | 90 |
| $CaCO_3$ | 10 | was mixed with 40 ml of the solution in Example VII. Foaming occurred immediately followed by very rapid setting of the foamed mass which had the following properties:

| | |
|---|---|
| Time to self supporting strength | approx 30 seconds |
| Density, | |
| 1 hour | 0.38 gm/cm$^3$ |
| 24 hours | 0.34 gm/cm$^3$ |
| Compressive strength (28 days) | 3.4 N/mm$^2$ |

EXAMPLE IX

A dry powder blend was made up to contain the following:

| | |
|---|---|
| pulverised fly ash | 70 |
| hollow pulverised fly ash spheres particle size less than 0.3 mm | 20 |
| $Al_2(SO_4)_3 14H_2O$ | 4 |
| $Ca Co_3$ | 3 |
| $Ca SO_4, H_2O$ | 3 |

The powder was mixed with water (25) parts in a container to form a grout which foamed almost immediately and expanded rapidly to fill the container. The foamed grout had the following properties.

| | |
|---|---|
| time to maximum volume | about 10 seconds |
| time to self supporting strength | about 30 seconds |
| density after 24 hours | 0.35 gm/cm$^3$ |
| compressive strength at 28 days | 3.5 N/mm$^2$ |
| particle size less than 0.3 mm | 20 |
| $Al_2(SO_4)_3 14H_2O$ | 4 |
| $CaCO_3$ | 3 |
| $Ca SO_4, \frac{1}{2}H_2O$ | 3 |

The powder was mixed with water (25) parts in a container to form a grout which foamed almost immediately and expanded rapidly to fill the container. The foamed grout had the following properties.

| | |
|---|---|
| time to maximum volume | about 10 seconds |
| time to self supporting strength | about 30 seconds |
| density after 24 hours | 0.35 gm/cm$^3$ |
| compressive strength at 28 days | 3.5 N/mm$^2$. |

I claim:

1. A method of establishing a rapid setting foamed composition at a desired location, the method comprising forming (i) an aqueous slurry of a pozzolan selected from fly ash and slags and a carbon dioxide gas producing agent selected from the group consisting of carbonate or bicarbonate, and (ii) a solution maintained separately from said slurry until later mixing, said solution comprising aluminum sulphate, water and a strengthening agent selected from the group consisting of calcium sulphate hemihydrate and lime, the aluminum sulphate forming an acid solution in water, and the strengthening agent being capable of reacting at high speed to stabilize the foam, the gas producing agent constituting about 1 to about 10% by weight of dry ingredients and the proportion of aluminum sulphate constituting about 1 to about 15% by weight of the dry ingredients, pumping the separately maintained slurry and solution to the desired location and causing them to mix there to form the rapidly set foamed lightweight composition.

2. The method according to claim 1, wherein the strengthening agent constitutes 2% to 25% by weight of the set composition.

* * * * *